United States Patent [19]

Hoffmeister et al.

[11] Patent Number: 4,556,438

[45] Date of Patent: Dec. 3, 1985

[54] LIGHTWEIGHT COMPOSITE LAUNCHER POD PRODUCTION PROCESS

[75] Inventors: Lawrence D. Hoffmeister, New Market; Richard J. Thompson, Huntsville, both of Ala.

[73] Assignee: The United States of America as represented by the Secretary of the Army, Washington, D.C.

[21] Appl. No.: 642,845

[22] Filed: Aug. 20, 1984

[51] Int. Cl.[4] .......................... B31C 13/00; B32B 5/18; B65H 81/00
[52] U.S. Cl. ...................................... 156/79; 156/173; 156/245; 264/46.9; 264/271.1; 264/277
[58] Field of Search .................. 156/79, 155, 173, 242, 156/245, 296; 264/45.1, 46.9, 261, 262, 271.1, 275, 277, 279, 279.1, 328.1

[56] References Cited

U.S. PATENT DOCUMENTS

| | | | |
|---|---|---|---|
| 2,829,400 | 4/1958 | Morin | 264/46.9 |
| 3,013,922 | 12/1961 | Fisher | 156/79 |
| 3,708,563 | 1/1973 | Sells | 264/46.9 |
| 3,733,233 | 5/1973 | Griffiths | 156/245 |
| 4,218,415 | 8/1980 | Biscaro | 264/46.9 |

Primary Examiner—Caleb Weston
Attorney, Agent, or Firm—Anthony T. Lane; Robert P. Gibson; James T. Deaton

[57] ABSTRACT

A process for making lightweight composite launcher pods in which a multiplicity of launcher tubes are wound on a multiplicity of mandrels and mounted in end structures of a mold and assembled into a generally rectangular mold structure and applying syntactic foam about the tube and spacer structure within the mold and finally curing the structure within the mold to provide a unitary lightweight composite launcher pod.

4 Claims, 11 Drawing Figures

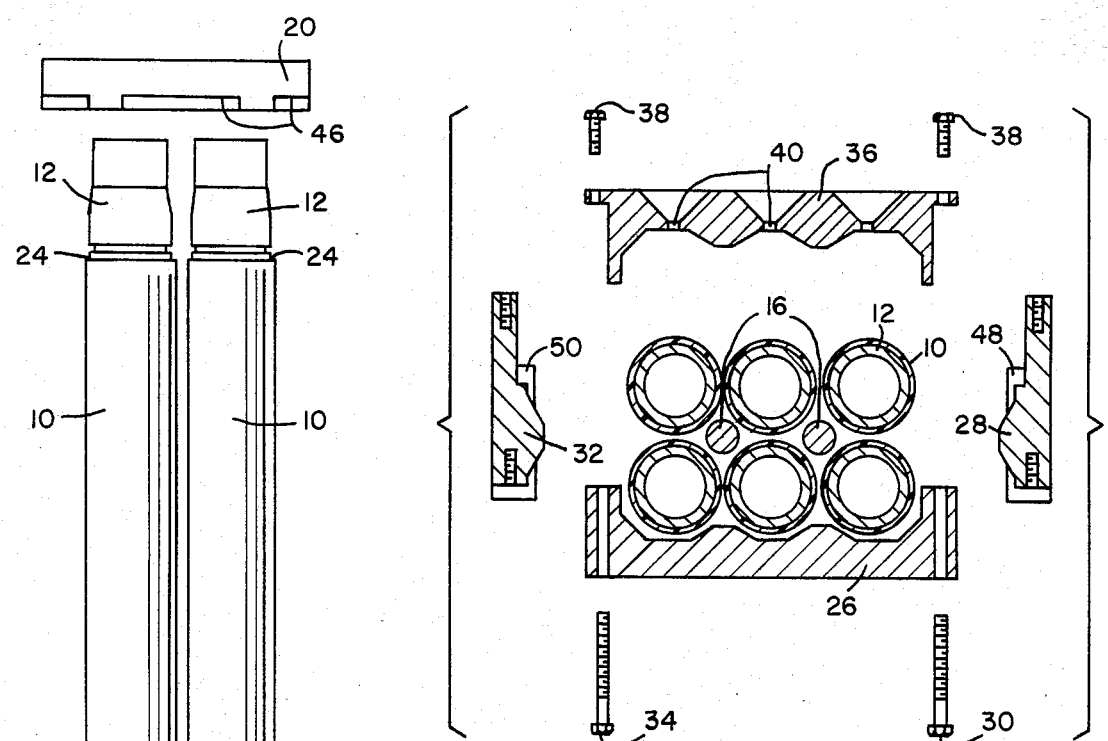
FIG. 4
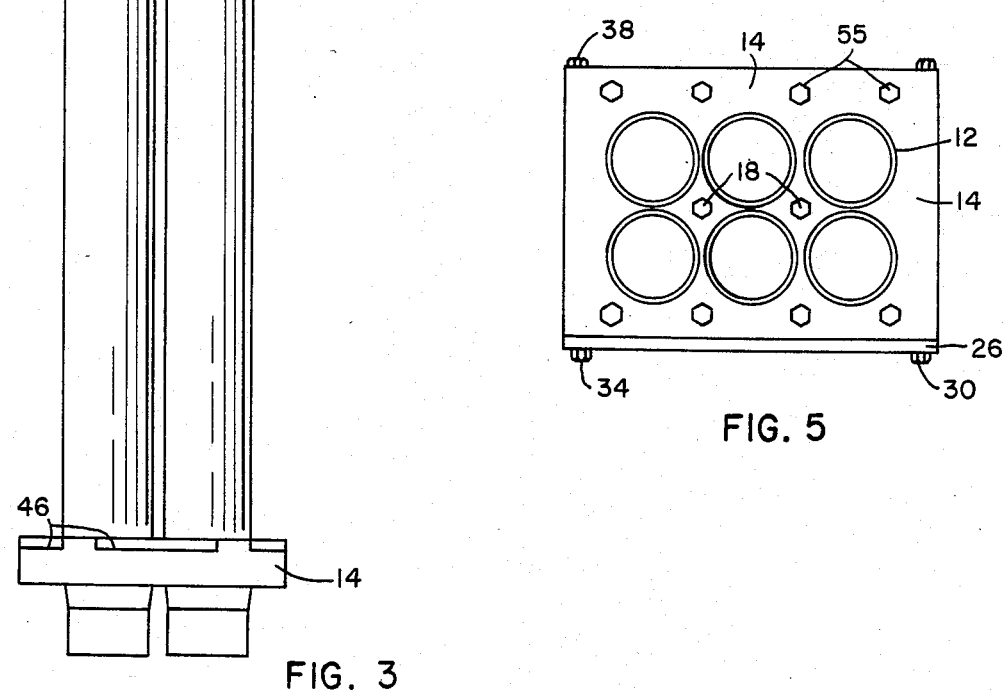
FIG. 3
FIG. 5

LIGHTWEIGHT COMPOSITE LAUNCHER POD PRODUCTION PROCESS

DEDICATORY CLAUSE

The invention described herein may be manufactured, used, and licensed by or for the Government for governmental purposes without the payment to us of any royalties thereon.

BACKGROUND OF THE INVENTION

In the past, an approach of a multiplicity of tubes has been to tie the tubes together at points along the length of the launch tubes to form a cluster of the individual tubes. This approach causes each individual tube to have its own individual strength for longitudinal stress as well as radial stress. Further, in this type construction, the tubes are geneally made of metal which adds undesirable weight to the launch tube cluster. Therefore, it can be seen that there is a need for a lightweight tube launching system that has a multiplicity of tubes of lightweight material that can withstand linear stress as well as radial stress and be clustered together in an accurate manner with each of the tubes aligned relative to each of the other tubes.

With the above needs in mind, it is an object of this invention to provide a system by which a compact, lightweight and economical launch tube arrangement is provided.

Another object of this invention is to provide a process by which a multiplicity of launch tubes can be accurately aligned and molded into a unitized structure to provide a lightweight and accurately aligned launch tube arrangement for small missiles.

Still another object of this invention is to provide a process by which a multiple launch tube arrangement can be made of all synthetic material.

A still further object of this invention is to provide a process which requires no specialized molding equipment outside of the mold.

A still further object of this invention is to provide a process by which the process is not limited to a specific tube configuration but a process that is flexible and can be expanded or contracted to accommodate the multiplicity of tube launchers desired for a specific configuration.

Other objects and advantages of this invention will be obvious to those skilled in this art.

SUMMARY OF THE INVENTION

In accordance with this invention, a process for producing a lightweight composite launcher pod includes filament winding a multiplicity of tubes on hollow steel mandrels using fiberglass wetted with epoxy resin, mounting the mandrels on a end structure of a mold, mounting tie rods to said end plate, heavily coating the tubes and the tie rods in a standing position with a high viscosity syntactic foam, securing a second end plate at the upstanding end of said mandrels and said tie rods to secure the mandrels and tie rods at each end, laying the secured assembly of the end plates, mandrels, and tie rods onto a bottom plate, securing side plates in place to said bottom plate and said end plates, securing a top plate to the side plates and the end plates, with the syntactic foam being applied and filling the spaces around the tubes and tie rods either as the bottoms, sides and tops are being secured or injected around these structures after they are all secured together as a unit.

The top plate is provided with reservoir ports to allow excess resin to be squeezed out if the resin is applied to the tubes and tie rods before the sides and base and top are assembled, and also to serve the purpose of allowing the resins to be drawn in by contraction of resin during cure. The contraction is the result of resin cross-linkage during cure. The fabrication of this process produces a lightweight composite launch pod and the structure of the lightweight composite launch pod secured in the mold structure of the sides and end plates is first cured at room temperature and next in an oven for a second cure time which is followed by a cool-down period and ultimately the sides of the mold and end plates of the mold are removed. Finally the mandrels and tie rods are removed to leave the molded structure. The final product produces a multiplicity of launch tubes that are accurately aligned for launching of rockets therefrom and the structure produced requires no finish machining other than the drilling of detent insert holes for mounting rockets in the tubes of the launcher. In some instances, rough brush-up is required of the structure adjacent the reservoir ports after the cured structure has been removed from the mold.

BRIEF DESCRIPTION OF THE DRAWINGS

FIG. 3 is a side view illustrating an end plate with mandrels and spacer rods mounted thereto with this structure illustrated on a reduced scale in comparison to that of FIGS. 1 and 2, FIG. 4 is a cross-sectional view in a dis-assembled array of the mold and illustrating the spacing of the mandrels and spacer rods relative to the bottom portion of the mold, FIG. 5 is an end view of the mold and illustrating the ends of the mandrels and the bolts which connect the spacer rods and other mold structures to the end plate.

DESCRIPTION OF THE PREFERRED EMBODIMENT

Figure 1:
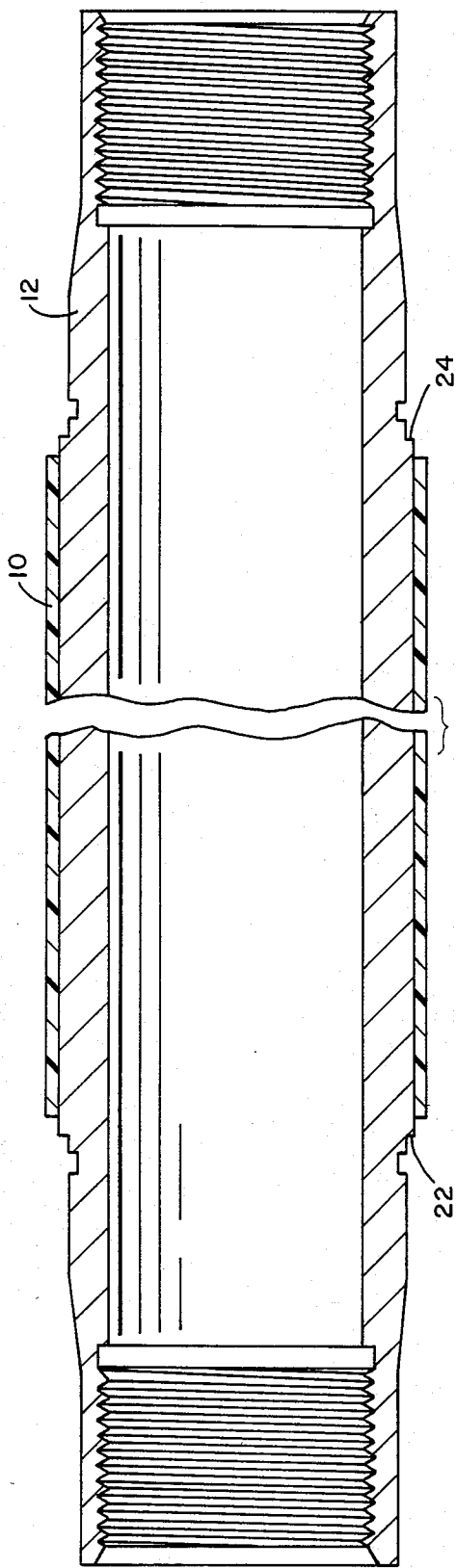
FIG. 1 is a sectional view of the mandrel used in the process of this invention and illustrating the tube thereon that has been wound from fiberglass impregnated with epoxy resin.
Figure 2:
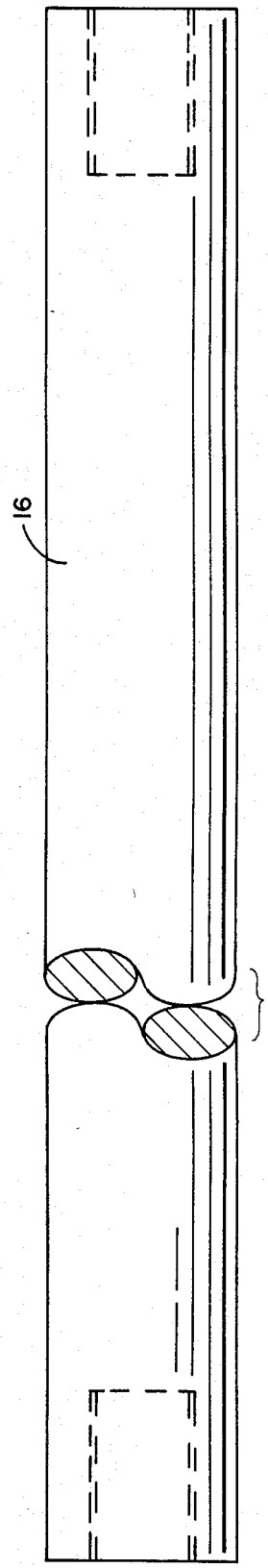
FIG. 2 is a sectional view of a spacer rod used in the process of this invention.
Figure 6:
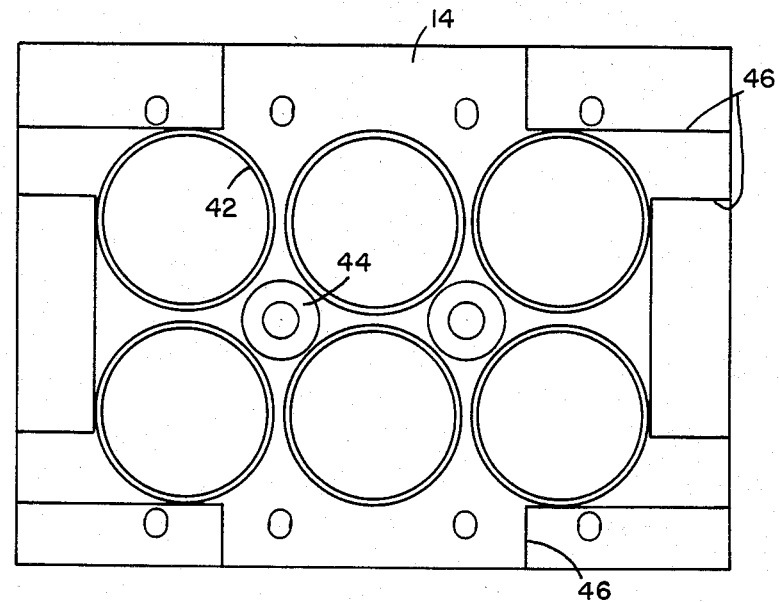
FIG. 6 is a top view of one of the end structures of the mold.
Figure 7:
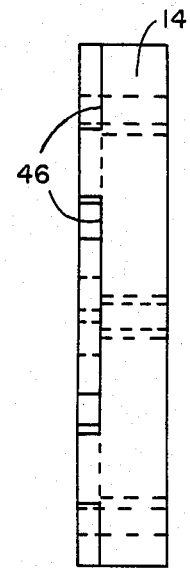
FIG. 7 is a side view of the end structure of the mold.
Figure 8:
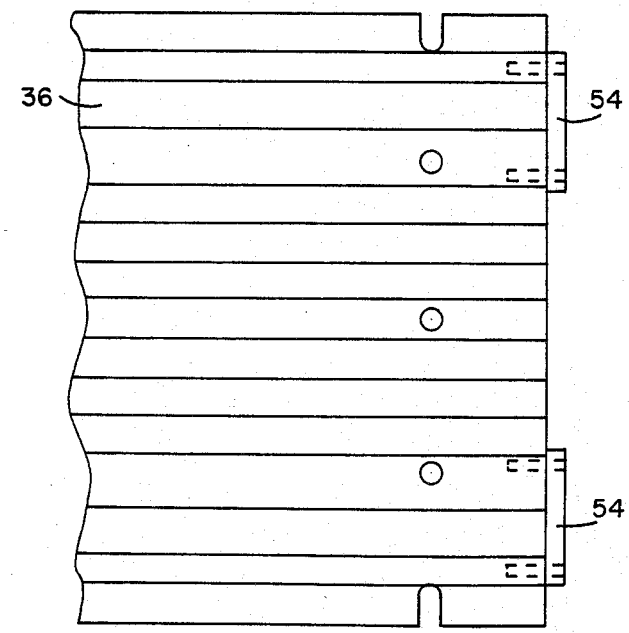
FIG. 8 is a view partially cut-away and illustrating the top structure of the mold with alignment tabs at one end.
Figure 9:
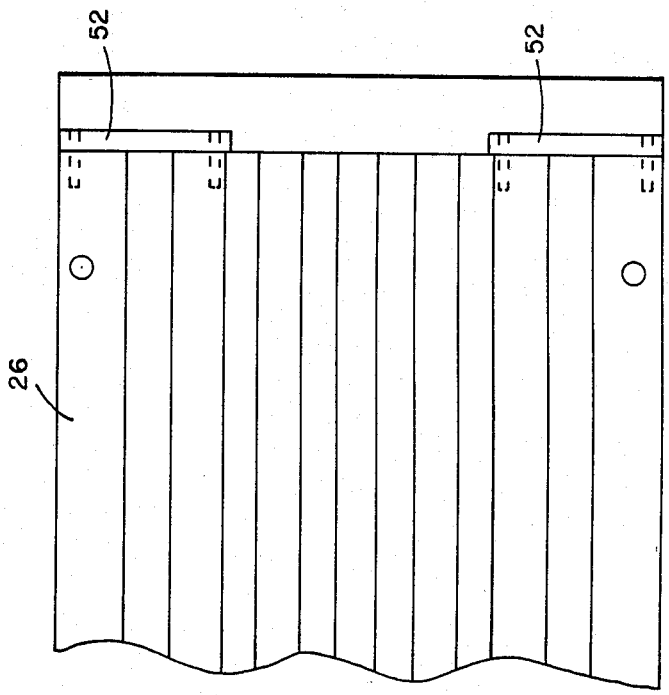
FIG. 9 is a view partially cut-away and of the bottom structure of the mold and also illustrating alignment tabs at one end.

Referring now to the drawings, the process is begun by filament winding a tube 10 on each of the desired number of hollow steel mandrels 12 using E-glass filament tow wetted with epoxy resin. This filament winding is done in a conventional manner. In the process disclosed herein, six mandrels 12 with the wet tubes 10 are stood vertically on end into a six-hole end plate 14 (See FIG. 3). End plate 14 is attached to a support stand in a conventional manner so that mandrels 12 with filament wound tubes 10 thereon are in a vertical position. Prior to mandrels 12 being stood in end plate 14, a high viscosity syntactic foam is heavily coated onto each of the tubes. After the first three mandrels 12 have been stood in place in the vertical position, two tie rods 16 as illustrated in FIG. 2 are coated with high viscosity syntactic foam and set in place relative to end plate 14 and secured in place by bolts 18 as illustrated in FIG. 5. Then the other three coated mandrels 12 are mounted in end plate 14. The two tie rods 16 act to draw the end plates 14 and 20 together and hold the assembly in place. That is, each end of tie rods 16 are drawn into end plates 14 and 20 to cause the overall length of the structure to be defined. After the six mandrels 12 and the two tie rods 16 have been set in place and secured to end plate 14 by bolts 18, second end plate 20 is then placed over the upper exposed ends of mandrels 12. Two additional bolts similar to bolts 18 are used to secure end plate 20 to the other ends of tie rods 16. Bolts 18 and the corresponding bolts at the other end of tie rods 16 are tightened to pull in plates 14 and 20 against shoulders 22 and 24 at opposite ends of each mandrel 12 as illustrated to define the overall length of the structure. Tie rods 16 and their bolt securing means hold the assembly together so that the entire structure can be moved from a vertical position as illustrated in FIG. 3 to a horizontal position as illustrated in FIG. 4 and onto bottom plate 26. Before the structure of FIG. 3 is placed in the horizontal position as illustrated in FIG. 4, high viscosity syntactic foam is placed on the surface of the bottom plate 26. Then the structure of FIG. 3 is placed in the horizontal position relative to bottom plate 26 as illustrated in FIG. 4. Next, a side such as side 28 is chosen to be installed and side 28 is moved into position and clamped in place by bolts 30 that are inserted through holes in bottom plate 26 and screwed into threaded openings in side plate 28 to clamp these two structures together. Side 32 is now ready to be installed and side 32 is moved into position and clamped in place by bolts 34 that are spaced along the length of the structure. With this operation complete, high viscosity syntactic foam is applied from the top of tubes 12 in the horizontal position to completely fill any voids about tubes 12 and tie rods 16. Finally, top plate 36 is moved in position over tubes 12 and between end plates 14 and 20 to complete the generally rectangular box-shaped structure. Plate 36 is secured in position by bolts 38 along the length thereof by being screwed into threaded sockets in sides 28 and 32 to secure top plate 36 in position. Top plate 36, as illustrated, has a plurality of openings 40 therethrough to relieve any excess of the syntactic foam material as the structure is being assembled. Also, during cure the syntactic foam material tends to contract and ports 40 aide in allowing the syntactic material to freely contract. Contraction of the syntactic material is the result of resin cross-linkage. End plates 14 and 20 each have stepped bores 42 and 44 (See FIG. 6) that accommodate tubes 12 and spacer rods 16 and machined out openings 46 accommodate alignment tabs 48 and 50 that are located at opposite ends of side members 28 and 32 (See FIG. 4), alignment tabs 52 on base member 26 (See FIG. 9), and alignment tabs 54 on top member 36 (See FIG. 8). Together, alignment tabs 48, 50, 52, and 54 innerlock with grooves 46 of end plates 14 and 20 and contact the surface of either one or two of tubes 12 to align the four sides of the pod structure with the axis of each tube 12. That is, the axis of each tube 12 is mounted to be parallel or substantially parallel to the axis of each of the other tubes 12, and alignment tabs 48, 50, 52 and 54 contact the tubes to cause the side surfaces of the pod structure to be parallel to the axes of the tubes. Indented grooves 42 and 44 serve to accurately align each of fiberglass tubes 10 from each end and the structure of end plates 14 and 20 cause the exact length of the tubes to be defined in an ultimately cured structure with accurately aligned launching tubes in a pod arrangement. End plates 14 and 20 each have eight bolts 55 (See FIG. 5) therein that secure end plates 14 and 20 to top structure 36 and bottom structure 26. As previously stated, tubes 12 are filament wound of E-glass filament that is tow wetted. However, the filament could be any fiberglass material, Kevlar, graphite, or any other similar material of this type that has the strength and structural support needed for supporting a tube of this type. The high viscosity syntactic foam used in this process includes Epon 826 epoxy resin by Shell Chemical Company, in an amount of 2,400 grams per batch. Araldite epoxy RD2 accelerator catalyst in an amount of 600 grams per batch. Tonox 6040 curative in an amount of 720 grams per batch, 250 Microballoons in an amount of 470 grams per batch, and a Cab-O-Sil thickening agent in an amount of 140 grams per batch. In some applications, it may be desirable to omit the Tonox from the mixture. This particular mixture has been found to provide an especially good high viscosity syntactic foam that is readily usable in this process to make composite launch tube pods that are very accurate and aligned as required.

Figure 10:
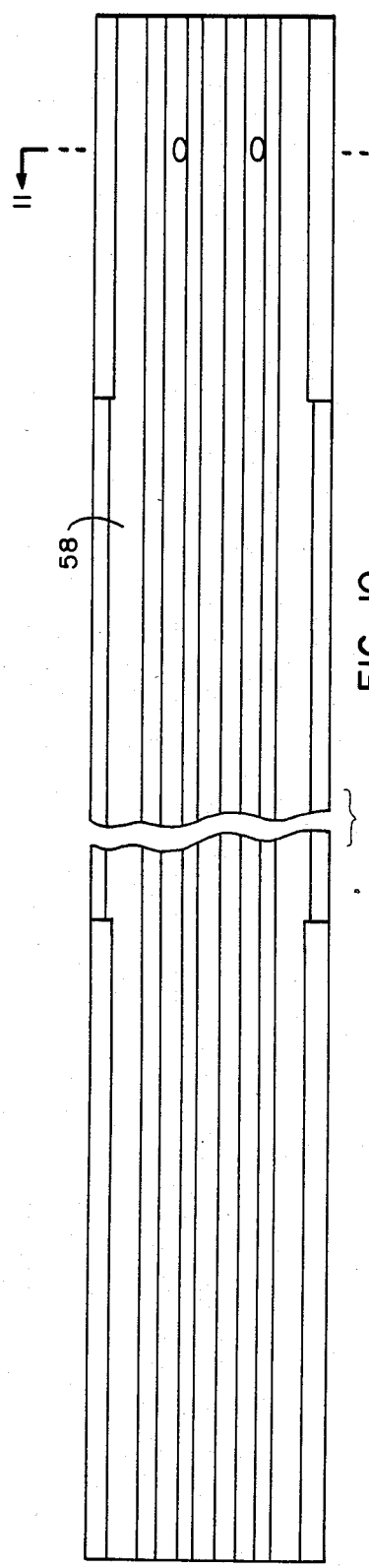
FIG. 10 is a view of the composite launch pod structure after being removed from the mold and illustrated as partially cut-away.
Figure 11:
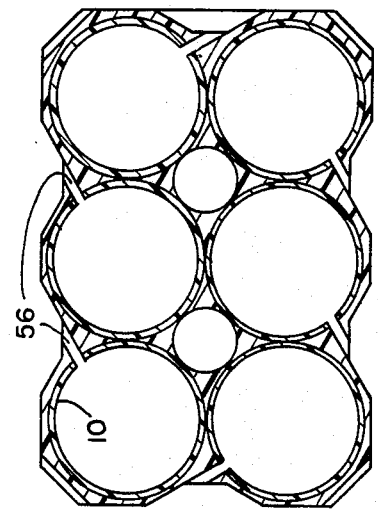
FIG. 11 is a sectional view along line 11—11 of FIG. 10.

After the composite structure has been cast in the mold structure as set forth supra, the structure is allowed to cure at room temperature for about 8 hours. Next, the entire mold and the structure therein is placed in an oven at 125° F. for 5 hours which is followed by a 3-hour rise time to 300° F. The structure is then maintained at 300° F. for a final cure of about 3 hours. After a cool-down period, sides 28 and 32 of the mold are removed and mandrels 12 are extracted from the tubes as well as spacer tie rods 16. The final product has the desired surface features molded therein as illustrated in FIG. 10, and tubes 12 are accurately aligned for launching rockets therefrom. Also, this process requires no finish machining other than removing rough edges that may have existed at ports 40 of top cover 36 and by drilling 6 detent insert holes 56 as illustrated in FIG. 11. The lightweight composite launch pod structure 58 as illustrated in FIG. 10 is an especially accurate structure that can be used to launch rockets accurately at targets. It is pointed out that the above process requires no specialized molding equipment other than the specific mold structure disclosed and this process is not limited to the 6 tube configuration illustrated herein, but feasibly can be expanded to other multiple tube launcher configurations of various sizes. It is pointed out that the outer shape of the overall structure is balanced in thickness relative to tubes 10 to prevent warpage. That is, the structure is well balanced from side to side.

If desired, the process can be altered in the way the syntactic foam is applied relative to the overall structure. That is, tubes 10 on mandrels 12 and tie rods 16 can be stood in position and assembled as described supra with the remainder of the mold structure being assembled piece by piece as set forth above until the mold has been completely assembled with tubes 10 and spacers 16 in position inside the mold. Bolts 18 at the top and base that project through end plates 14 and 20 and into spacer rods 16 can be provided with openings as well as openings in rods 16 or other openings in end plates 14 and 20 can be provided to allow the high viscoisty syntactic foam to enter at the base of the mold and fill the space around tubes 10 and spacers 16 until the foam rises to the top end structure 20 and finally would be vented through the holes at the top. If this step is used, holes 40 must also be plugged when the foam is being injected into the mold, or a top cover is used that has no holes 40 therein. It has been found that all the syntactic material can be applied to the tubes in this injection manner to produce just as good a structure as the steps of the process set forth above.

We claim:

1. A process for producing lightweight composite launcher pods comprising filament winding the desired number of launch tubes on the desired number of mandrels, accurately mounting the mandrels in end structures of a mold, mounting tie rod spacers between end structures of the mold to accurately position and clamp the end structures of the mold, mounting bottom, sides, and top structures of a mold to the end structures to provide a rectangular box-shaped structure with the wound tubes enclosed therein, providing a high viscosity syntactic foam completely about said tubes and said tie rod spacers to fill said mold, curing the tubes and the high viscosity syntactic foam in the mold structure at room temperature for a predetermined number of hours, placing the mold structure in an oven at about 125° F. for several hours and then bringing the temperature up sufficient to cause complete curing of the tubes and the high viscosity syntactic foam and heating the structure at this predetermined temperature until cured, allowing the cured structure to cool down, removing the top, sides, bottom and end plates of the mold, and removing the mandrels and spacers from the cured structure to provide a composite launcher pod that has accurately aligned tubes thereof from which rockets can be launched.

2. A process as set forth in claim 1, wherein said tubes of said composite launch pod structure each are drilled to provide a insert hold from which a detent can be inserted for mounting a rocket in each of the tubes of the composite structure.

3. A process as set forth in claim 1, wherein said high viscosity syntactic foam is injected into said mold structure to fill the space around the tubes.

4. A process as set forth in claim 1, wherein said high viscosity syntactic foam is placed in and around the tubes and spacer rods as said mold structure is being assembled around the tubes and spacer rods.

* * * * *